US008709262B2

(12) United States Patent
Asiri et al.

(10) Patent No.: US 8,709,262 B2
(45) Date of Patent: Apr. 29, 2014

(54) SYNTHESIZING AND UTILIZING SOLAR LIGHT ACTIVATED NANO-PARTICLE PHOTOCATALYST

(71) Applicant: King Abdulaziz University, Jeddah (SA)

(72) Inventors: Abdullah Mohamed Asiri, Jeddah (SA); Sher Bahadar Khan, Jeddah (SA); Khalid Ahmad Alamry, Jeddah (SA); Mohammed M Rahman, Jeddah (SA); Mohamed Saeed Alamoodi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 13/737,840

(22) Filed: Jan. 9, 2013

(65) Prior Publication Data
US 2013/0186840 A1    Jul. 25, 2013

(51) Int. Cl.
*C02F 1/58* (2006.01)
*B01J 27/25* (2006.01)

(52) U.S. Cl.
USPC ............ 210/748.14; 210/748.01; 210/748.11; 210/739; 210/763; 210/806; 210/695; 252/175; 428/402; 502/80; 502/100; 502/101; 502/102; 502/349; 422/186.3; 423/622; 435/32

(58) Field of Classification Search
CPC ................................ C02F 1/58; B01J 27/25
USPC .......... 210/748.01, 748.11, 748.14, 739, 763, 210/806, 695, 201, 223; 422/186.3, 20, 21, 422/22; 502/80, 100, 101, 102, 242, 349, 502/506; 423/622; 435/32
See application file for complete search history.

(56) References Cited

U.S. PATENT DOCUMENTS

| 5,494,805 | A  | * | 2/1996  | Van Rijn et al. ................. 435/32 |
| 6,544,426 | B2 | * | 4/2003  | Mori et al. ..................... 588/306 |
| 2002/0117392 | A1 | * | 8/2002  | Noguchi et al. ......... 204/157.15 |
| 2005/0249660 | A1 | * | 11/2005 | Liao et al. ....................... 423/622 |
| 2007/0154561 | A1 | * | 7/2007  | Takeda et al. ................. 424/489 |
| 2010/0111817 | A1 | * | 5/2010  | Taniguchi et al. ............. 423/472 |
| 2010/0167914 | A1 | * | 7/2010  | Anderson et al. ............... 502/80 |
| 2011/0319808 | A1 | * | 12/2011 | Bowler et al. ................... 604/20 |

OTHER PUBLICATIONS

Rekha Dom, et al., Synthesis of solar active nanocrystalline ferrite, MFe2O4 (M: Ca, Zn, Mg) photocatalyst by microwave irradiation, Solid State Communications 151 (2011) 470-473.

(Continued)

*Primary Examiner* — Joseph Drodge
*Assistant Examiner* — Cameron J Allen
(74) *Attorney, Agent, or Firm* — Geeta Kadambi; Riddhi IP LLC

(57) ABSTRACT

Toxic organic materials contaminate water resources and one need to find an easy and energy efficient way to decontaminate water resources. The current invention discloses a photocatalyst Fe doped ZnO nano-particle photocatalyst that enables the decontamination process by degrading toxic organic material such as brilliant cresyl blue, indigo carmine and gentian blue by using solar light. In the current disclosure many examples of characterization of the photocatalyst, optimal working conditions and efficient use of solar light has been described. The process described to use the photocatalyst to degrade toxic organic material using the solar light to activate the photocatalyst is cost efficient and cheap to clean our water resources.

12 Claims, 7 Drawing Sheets

(56) References Cited

OTHER PUBLICATIONS

Raja et al., Highly dispersed PTFE/Co3O4 flexible films as photocatalyst showing fast kinetic performance for the discoloration of azo-dyes under solar irradiation, , Journal of Photochemistry and Photobiology A: Chemistry 187 (2007) 332-338.

Wang et al., Preparation of S-TiO2 photocatalyst and photodegradation of L-acid under visible light, Applied Surface Science 254 (2008) 5276-5280.

Wawrzyniak et al., Solar-light-induced photocatalytic decomposition of two azo dyes on new TiO2 photocatalyst containing nitrogen, Applied Catalysis B: Environmental 62 (2006) 150-158.

Zhu et al., Low temperature synthesis of anatase rare earth doped titania-silica photocatalyst and its photocatalytic activity under solar-light, Colloids and Surfaces A: Physicochem. Eng. Aspects 355 (2010) 178-182.

Zhao et al., Enhancement of photocatalytic degradation of polyethylene plastic with CuPc modified TiO2 photocatalyst under solar light irradiation, Applied Surface Science 254 (2008) 1825-1829.

Im et al., Improved photodegradation properties and kinetic models of a solar-light-responsive photocatalyst when incorporated into electrospun hydrogel fibers, Journal of Colloid and Interface Science 346 (2010) 216-221.

Pelentridou et al., Photodegradation of the herbicide azimsulfuron using nanocrystalline titania films as photocatalyst and low intensity Black Light radiation or simulated solar radiation as excitation source, Journal of Hazardous Materials 163 (2009) 756-760.

Mohapatra et al., Zn—Cr layered double hydroxide: Visible light responsive photocatalyst for photocatalytic degradation of organic pollutants, Separ. Purif. Technol. (2011), doi:10.1016/j.seppur.2011.10.028.

* cited by examiner

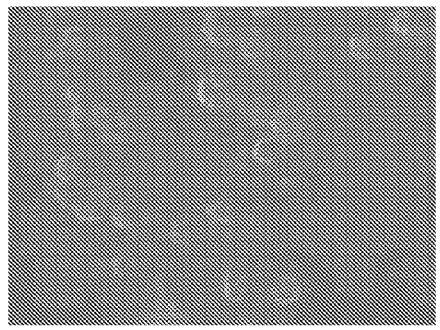
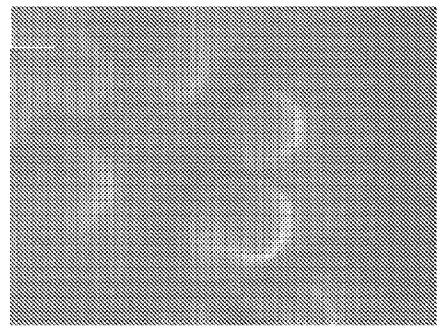
FIG.1A  FIG.1B
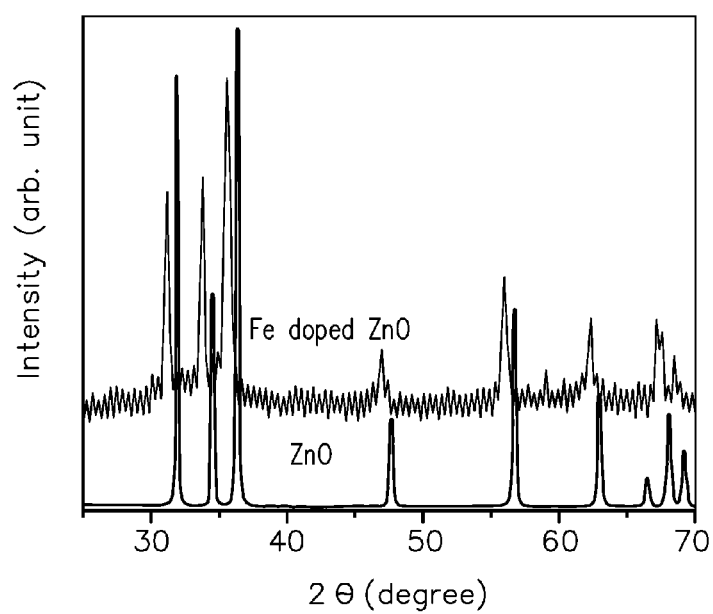
FIG.2

SYNTHESIZING AND UTILIZING SOLAR LIGHT ACTIVATED NANO-PARTICLE PHOTOCATALYST

FIELD OF TECHNOLOGY

This disclosure generally relates to synthesizing an Iron (Fe) doped Zinc Oxide (ZnO) nano-particle photocatalyst and using the said novel photocatalyst as a solar light activated photocatalyst to remove hazardous and toxic chemicals.

BACKGROUND

Environmental pollution has received considerable attention due to their harmful effect on human health and living organisms. The industrial progress causes several severe environmental problems by releasing wide range of toxic compound to the environment. Thousands of hazardous waste locations have been produced worldwide consequential from the accumulation of organic pollutants in soil and water over the years. Monitoring of environmental pollution is therefore one of the most important needs for selecting pollution controlling option. Among various pollutants, organic dyes are hazardous and toxic pollutants and have adverse effect on living organisms. Dyes are carcinogenic, hazardous, mutagenic, toxic (cytotoxic and embryo-toxic) to mammals. Thus dyes are risky and unsafe for human health and environment. Because of its high solubility and stability in water, it has been found in freshwater, marine environments and industrial waste waters and is difficult to degrade by traditional techniques.

$TiO_2$ and ZnO have proven their self as a dynamic photocatalyst. However these photocatalyst only encourage photocatalysis upon irradiation by UV light because it absorb only in the UV region of round about 375 nm with the band gap (~3.2 ev) in UV region. For solar light photocatalysis, a photocatalyst must promote photocatalysis by irradiation with solar light because solar light spectrum consists of 46% of solar light while the UV light is only 5-7% in the solar light spectrum. This least coverage of UV light in the solar spectrum, the high band gap energy (3.2 eV), and fast charge carrier recombination (within nanoseconds) of ZnO confines its extensive application in the solar light spectrum range.

Several researchers have made and used catalysts to remove contaminants using UV light. Dom et al. (2011) synthesized $MgFe_2O_4$, $ZnFe_2O_4$ and $CaFe_2O_4$ by low temperature microwave sintering and applied for the photocatalytic degradation of organic pollutant using solar light. They found high photocatalytic performance of these oxides by degradation of methylene blue in the presence of solar light. Raja et al. (2007) reported a solar photocatalyst based on cobalt oxide and found to be a good solar photocatalyst for the degradation of azo-dye orange II. Wawrzyniak et al. (2006) have synthesized a solar photocatalyst based on $TiO_2$ containing nitrogen and applied for the degradation of azo-dye which completely degraded under solar light. Wang et al. (2008) degraded L-acid up to 83% by using S-doped $TiO_2$ under solar light. Mohapatra and Parida (2011) have synthesized Zn based layered double hydroxide and applied for the degradation and found that layered double hydroxide will be a prominent solar photocatalyst for the degradation of organic chemicals. Zhu et al. (2010) have developed several solar photocatalyst based on $Sm^{3+}$, $Nd^{3+}$, $Ce^{3+}$ and $Pr^{3+}$ doped titanium-silica and found as good applicants for industrial applications. Zhao et al. (2008) synthesized $TiO_2$ modified solar photocatalyst and reported as good candidate for the photocatalytic degradation of plastic contaminants under solar light. Im et al. (2010) have synthesized hydrogel/$TiO_2$ photocatalyst for the degradation of organic pollutants under solar light. Pelentridou et al. (2009) treated aqueous solutions of the herbicide azimsulfuron with titanium nanocrystalline films under solar light and found photo degradation of herbicide in few hours demonstrated titanium as best candidate for purification of water containing herbicide. However, there is a need for a catalyst that is cheaper and faster to operate for decontamination use.

SUMMARY

The invention discloses a Fe doped ZnO nano-particle photocatalyst, a method of synthesizing Fe doped ZnO nano-particle photocatalyst. The instant invention also discloses a method of using the Fe doped ZnO nano-particle photocatalyst.

In one embodiment, method of synthesizing Fe doped ZnO nano-particle photocatalyst is described. In another embodiment, a characterization of Fe doped ZnO nano-particle photocatalyst is described. In another embodiment, using the Fe doped ZnO nano-particle photocatalyst and activating the said catalyst using the solar light to degrade organic contaminant in a sample is described. The sample may be water resources for example.

In one preferred embodiment, the synthesis and characterization of Fe doped ZnO nano-particle that can be used in a small amount in the degradation of organic pollutant is described. The present invention also presents the kinetics and mechanism of dye degradation using Fe doped ZnO nano-particle as solar light activated photocatalyst. The present invention also presents the photocatalytic activity of Fe doped ZnO nano-particle for degrading various dyes such as brilliant cresyl blue, indigo carmine and gentian violet.

In another embodiment, characterizations of several properties of the novel Fe doped ZnO nano-particle photocatalyst were performed. These characterizations were performed to prove the efficacy and effectiveness of the novel photocatalyst.

The novel Fe doped ZnO nano-particle photocatalyst composition, method of synthesizing the novel Fe doped ZnO nano-particle photocatalyst catalyst and method of using the novel Fe doped ZnO nano-particle photocatalyst in chemical reactions, disclosed herein, may be implemented in any means for achieving various aspects. Other features will be apparent from the accompanying figures and from the detailed description that follows.

BRIEF DESCRIPTION OF THE DRAWINGS

Example embodiments are illustrated by way of example and no limitation in the tables and in the accompanying figures, like references indicate similar elements and in which:

FIGS. 1A and 1B shows different magnification FESEM images of Fe doped ZnO nano-particle photocatalyst (Catalyst).

FIG. 2 XRD spectrum of the Fe doped ZnO nano-particle photocatalyst.

Figure 3:
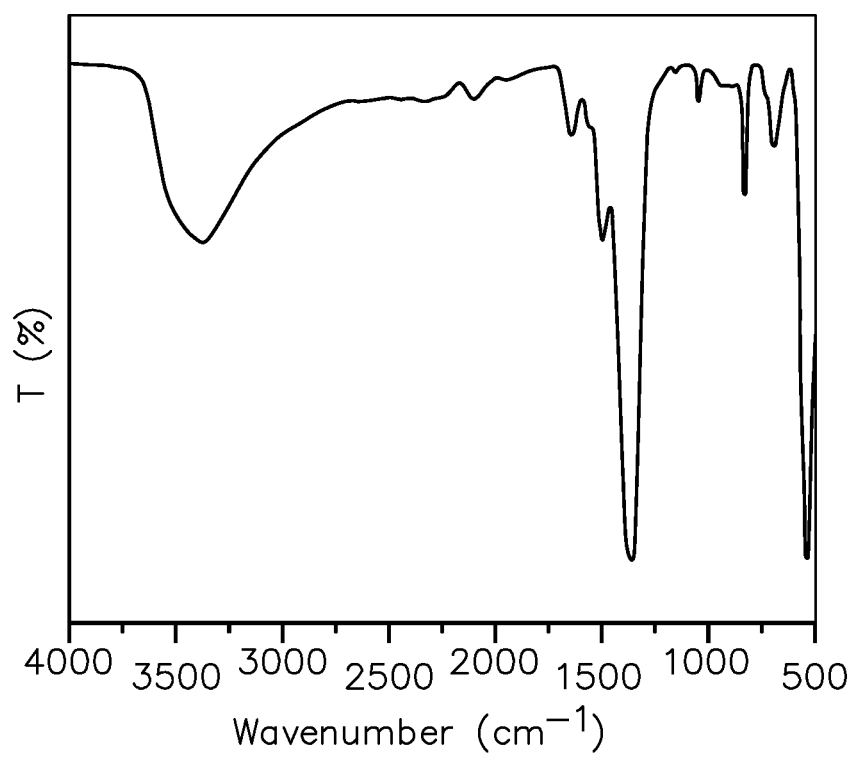
FIG. 3 FTIR spectra of the Fe doped ZnO nano-particle photocatalyst.

Other features of the present embodiments will be apparent from the accompanying figures and the detailed description that follows.

DETAILED DESCRIPTION

Several embodiments for a method of making/preparing Fe doped ZnO nano-particle photocatalyst, method of using the Fe doped ZnO nano-particle photocatalyst for decontamination purpose are disclosed. Although the present embodiments have been described with reference to specific example embodiments, it will be evident that various modifications and changes may be made to these embodiments without departing from the broader spirit and scope of the various embodiments.

Preparation of Fe Doped ZnO Nano-Particle Photocatalyst:

Materials—Iron Nitrate (Aldrich), Zinc Nitrate (Aldrich), Sodium hydroxide (Aldrich), were commercially available and were used without further purification.

Iron nitrate and zinc nitrate (1:3 mole ratio) was dissolved in distilled water completely to obtain a homogeneous solution at an ambient temperature/room temperature (25° C.). The pH of the homogeneous solution was adjusted above 10.0 by adding 0.2M Sodium hydroxide (NaOH) solution drop wise while vigorously stifling the homogeneous solution at a constant pace and a pH adjusted homogeneous solution was obtained. The pH adjusted homogeneous solution is heated overnight at 60° C. with constant stifling. After overnight heating the solution is cooled to ambient temperature/room temperature (25° C.) to obtain a precipitate of Fe doped ZnO photocatalyst. The solution containing Fe doped ZnO photocatalyst precipitate is centrifuged at 2000 rpm. The supernatant is discarded the Fe doped ZnO photocatalyst precipitate is saved. The Fe doped ZnO photocatalyst precipitate is washed using ethanol and the process is repeated three times. The washed precipitate is dried first at ambient temperature/room temperature (25° C.) and then in oven at 60° C. The dried product is grinded to obtain Fe doped ZnO nano-particle particle photocatalyst. The size of the final Fe doped ZnO nano-particle photocatalyst is 100 nm. The Fe doped ZnO nano-particle photocatalyst is then stored in a clean, dry and inert plastic vials until further use.

Morphology of the Fe Doped ZnO Nano-Particle Photocatalyst:

The morphology of the Fe doped ZnO nano-particle photocatalyst that was prepared but not calcined was investigated by FESEM and the low and high magnified images were depicted in FIGS. 1A and 1B. FESEM images show that the low magnification and high resolution image of spherical nano-particles with average diameter of 50 nm.

Characterization of the Fe Doped ZnO Nano-Particle Photocatalyst:

The surface morphology of the nano-particles was studied using a JEOL Scanning Electron Microscope (JSM-7600F, Japan) used for taking FESEM in FIG. 1. X-ray diffraction spectrum (XRD) was taken with a computer controlled X'Pert Explorer, PANalytical diffractometer and shown in FIG. 2. FT-IR spectra were recorded in the range of 400 to 4000 cm-1 on PerkinElmer (spectrum 100) spectrometer. UV spectrum was recorded from 200-800 nm using UV-visible spectrophotometer (UV-2960, LABOMED Inc). The crystalinity and crystal structure of the as grown nano-particles were evaluated by XRD and the XRD spectrum is shown in FIG. 2. XRD of Fe doped ZnO has been compared with pure ZnO. ZnO shows peaks corresponding to peaks at (100), (002), (101), (102), (110), (103), (200), (112) and (201). Fe doped ZnO exhibited slight shift of XRD peak positions which might be due to change in lattice spacing.

Structural Characterization of the Nano-Particles:

The Fe doped ZnO nano-particle photocatalyst is structurally characterized by FTIR which showed a high intense peak is at 530 cm$^{-1}$. This may be attributed to M-O of metal oxide. The results are shown in FIG. 3.

Figure 4:
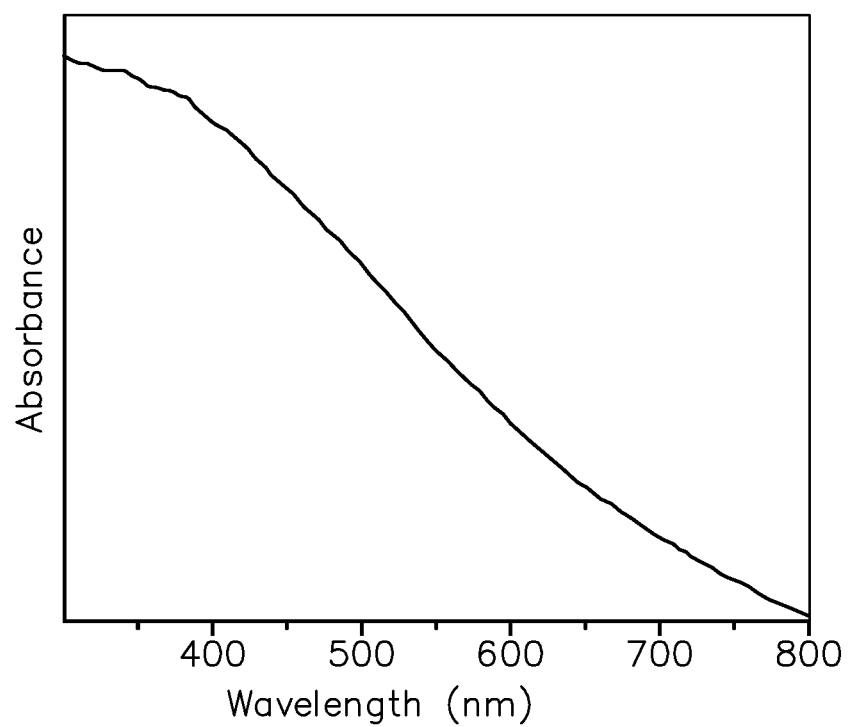
FIG. 4 UV-Vis. spectrum of Fe doped ZnO nano-particle photocatalyst.

Optical Properties of the Nano-Particles:

The UV spectrum showed a broad UV spectrum in the visible region from 400~600 nm which confirm that as grown nano-particles can absorb light in the visible region and thus cause degradation under solar light. The results are shown in FIG. 4.

Figure 12:
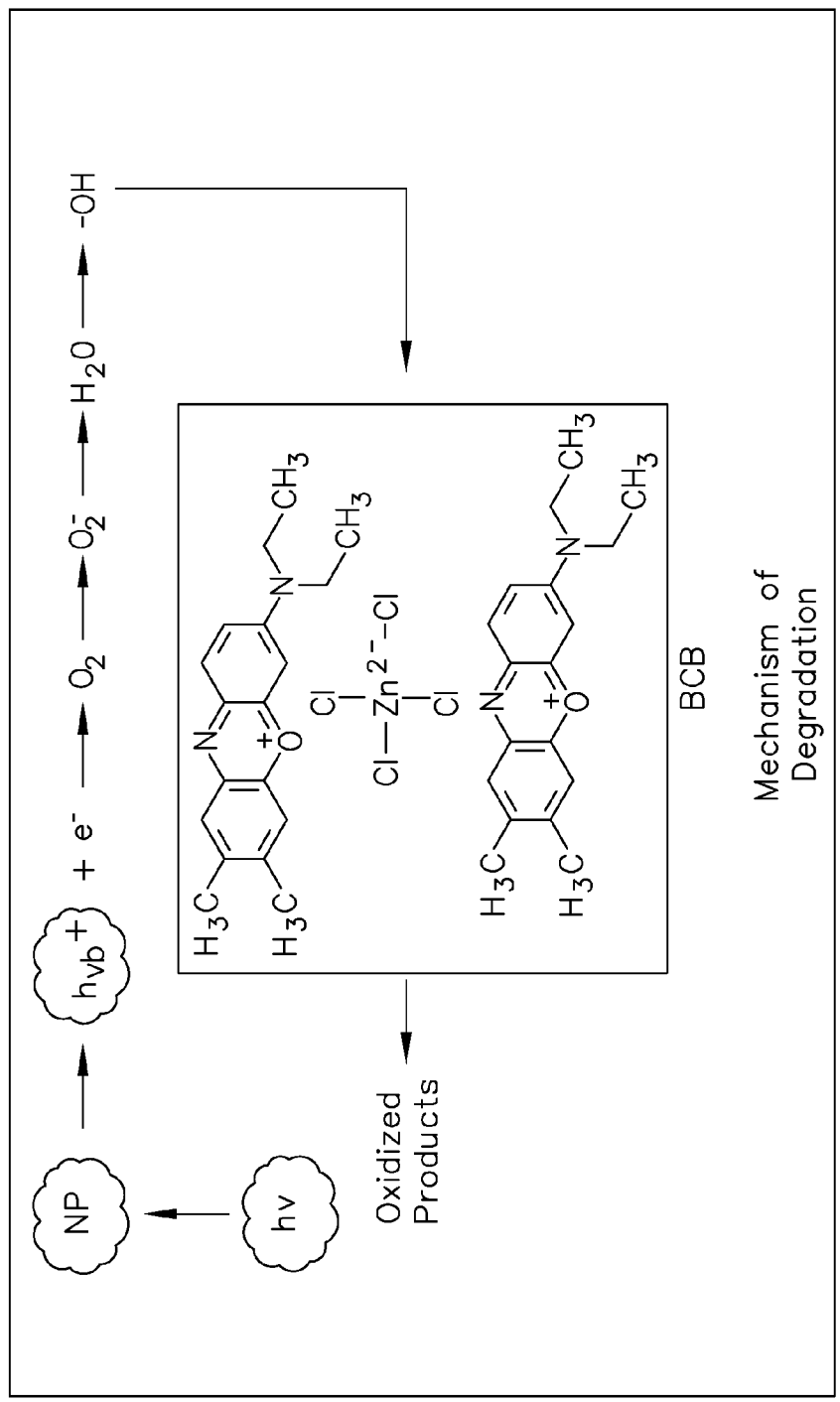
FIG. 12 is a schematic view of photo-catalytic reaction for Fe doped ZnO nano-particle photocatalyst.

Method of using the Fe Doped ZnO Nano-Particle Photocatalyst:

FIG. 12 depicts that heterogeneous photo-catalysis mechanism is involved for the degradation of brilliant cresyl blue, indigo carmine and gentian violet. Briefly, when Fe doped ZnO nano-particle photocatalyst were exposed to light having energy equal to or greater than the its band gap, formation of electron and hole pair take place on the surface of Fe doped ZnO nano-particle photocatalyst. If charge separation is maintained then this electron hole pair participates in redox reaction with organic substrate present in water in presence of oxygen. Hydroxyl radicals (OH$^{\bullet}$) and superoxide radical anions ($O_2^{\bullet-}$) are supposed to be the main destructive agents (oxidizing species) and these oxidative reaction results in the oxidation of the brilliant cresyl blue (BCB), indigo carmine and gentian violet. The whole mechanism of photo-activity of Fe doped ZnO nano-particle photocatalyst is depicted in scheme and shown in FIG. 12.

Several experiments were conducted to show the efficacy of using Fe doped ZnO nano-particle photocatalyst (catalyst) to degrade organic pollutants such as BCB, indigo carmine and gentian violet in solution using solar light to activate the catalyst. The photo-catalytic activity of Fe doped ZnO nano-particle photocatalyst was evaluated through degradation of brilliant cresyl blue, indigo carmine and gentian violet under solar light irradiation. The dye is stable under solar light irradiation in absence of photo-catalyst.

In photocatalysis degradation, different 100.0 mL, $1 \times 10^{-4}$ M of each dye solutions were taken in different beakers and adjusted the pH 5, 7, 8 and 10 respectively by drop wise addition of 0.2M NaOH solution under vigorous stirring then add almost 0.12 g catalyst into each reaction solution and then, irradiated the solution under solar light at constant stifling. The dye solution of about 4-5 mL were takes out at regular interval and measured the absorbance at $\lambda_{max}$=595.0 nm by using spectrophotometer The controlled experiments were also performed under solar light without catalyst to measure any possible direct photocatalysis of dyes. Control experiments were performed using the dye solutions (BCB, indigo carmine and gentian violet). The pH for the dye solutions were adjusted and while stirring they were exposed to solar light without adding Fe doped ZnO nano-particle photocatalyst along with experimental samples.

In one embodiment, photo-catalytic degradation of brilliant cresyl blue was performed at pH 5, pH 7, pH 8, pH 10 using Fe doped ZnO nano-particle photocatalyst. First, the experiment without catalyst under solar light irradiation resulted in small amount of degradation indicating photolysis reaction exists. Second, photo-catalytic degradation of brilliant cresyl blue solution while stifling was carried out in presence of Fe doped ZnO nano-particle photocatalyst under solar light (visible range light) irradiation. The effect of pH on the photo-catalytic degradation of brilliant cresyl blue in the presence of Fe doped ZnO nano-particle photocatalyst under solar light irradiation was also conducted. Fe doped ZnO nano-particle photocatalyst showed efficient catalytic activity for degradation of brilliant cresyl blue at different pH under solar light irradiation.

In each photocatalysis degradation reaction, 100.0 mL of dye solutions ($1\times10^{-4}$ M) was taken in beakers and adjusted the pH by drop wise addition of 0.2M NaOH solution under vigorous stirring. 0.1006±0.005 g of Fe doped ZnO was then added into reaction solutions and allowed them to keep in dark for physical adsorption of dye on catalyst surface. The solution was then irradiated under sunlight at constant stirring. At different time, 4-5 mL of solution was pipetted out at regular interval and measured the absorbance by using UV-visible spectrophotometer.

Figure 5:
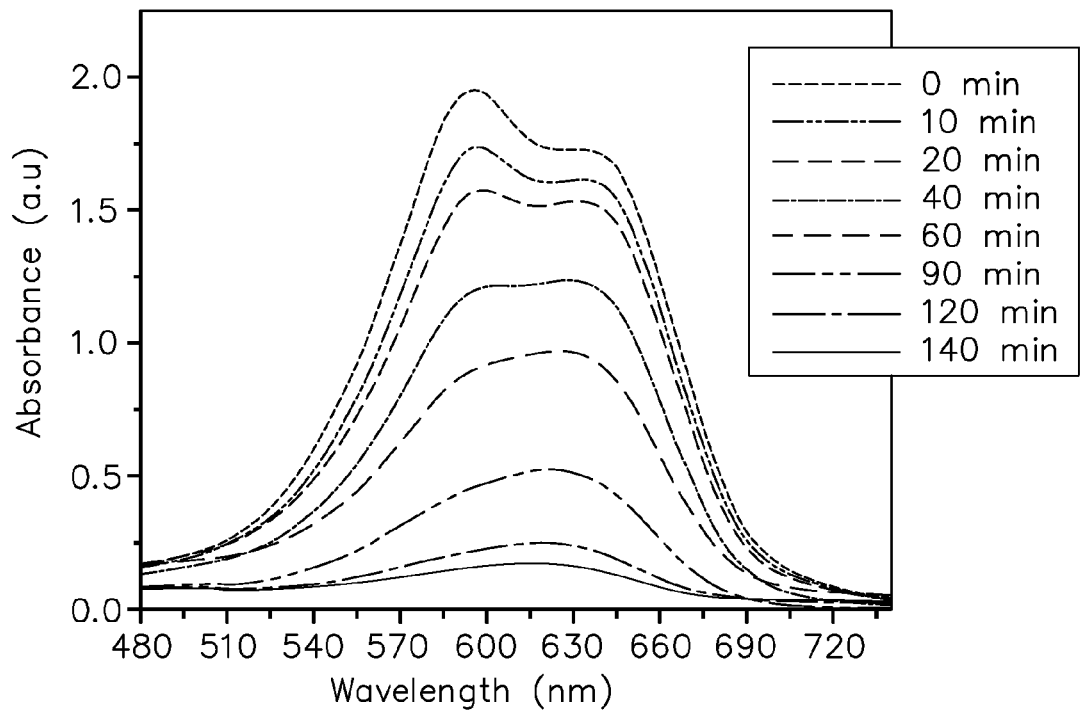
FIG. 5 change in absorbance vs irradiation time for brilliant cresyl blue in the presence of Fe doped ZnO nano-particle photocatalyst.

Aqueous suspension of brilliant cresyl blue was irradiated with solar light in the presence of Fe doped ZnO nano-particle photocatalyst and lead to change in absorbance as a function of irradiation time. FIG. 5 displays the change in absorption spectra for the photo-catalytic degradation of brilliant cresyl blue at different time intervals was done. The results showed decrease in absorption intensity. It was also observed that the maximum absorbance was at 595 nm and the absorbance gradually decreases with increase in irradiation time. FIG. 5. shows that the change in absorbance vs. irradiation time for brilliant cresyl blue in the presence of Fe doped ZnO nano-particle photocatalyst.

Figure 6:
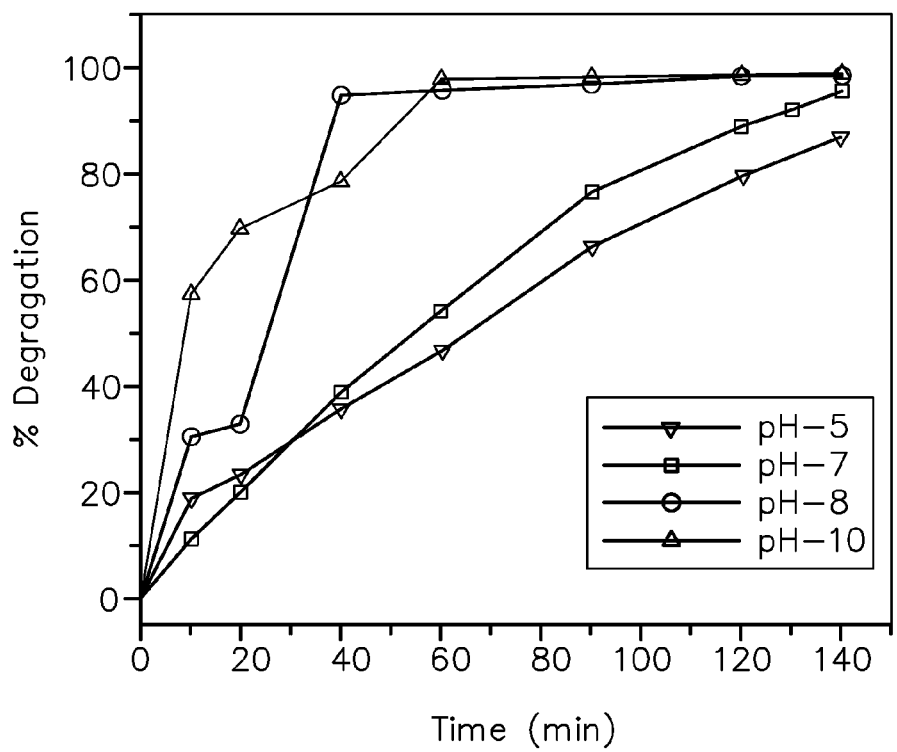
FIG. 6 is a graph of percentage (%) degradation vs irradiation time for brilliant cresyl blue at various pH in the presence of Fe doped ZnO nano-particle photocatalyst.

In one example, as shown in FIG. 6, percentage degradation of brilliant cresyl blue at various pH in the presence of Fe doped ZnO nano-particle photocatalyst. FIG. 6 shows the plot for the % degradation vs. irradiation time (min) at different pH for the aqueous suspension of brilliant cresyl blue in the presence of Fe doped ZnO nano-particle photocatalyst. It could be seen from the figure that 86.6, 95.5, 98.5, 98.8% of brilliant cresyl blue is degraded at pH 5, 7, 8 and 10 respectively in the presence of Fe doped ZnO nano-particle photocatalyst after 140 minutes of irradiation time. In the absence of Fe doped ZnO nano-particle photocatalyst no observable loss of brilliant cresyl blue was observed.

The effect of pH on the solar light photocatalytic degradation of brilliant cresyl blue was studied in pH range 5-10. The results showed that rate of decomposition of brilliant cresyl blue increases with increase in pH. At pH 10 brilliant cresyl blue was 98.8% degraded in the presence of Fe doped ZnO nano-particle photocatalyst. The photocatalytic performance of Fe doped ZnO nano-particle photocatalyst were attributed to the surface electrical properties, which facilitate the dye adsorption. The beneficial effect on the surface helps to promote the utilization of solar light generated charge carrier i.e. electron to the surface which leads to formation of hydroxide radical. Moreover, pH of the dye solution has substantial influence on the photocatalytic degradation process, in a preferred embodiment, pH 10 is considered optimal for degrading all the three dyes.

Figure 7:
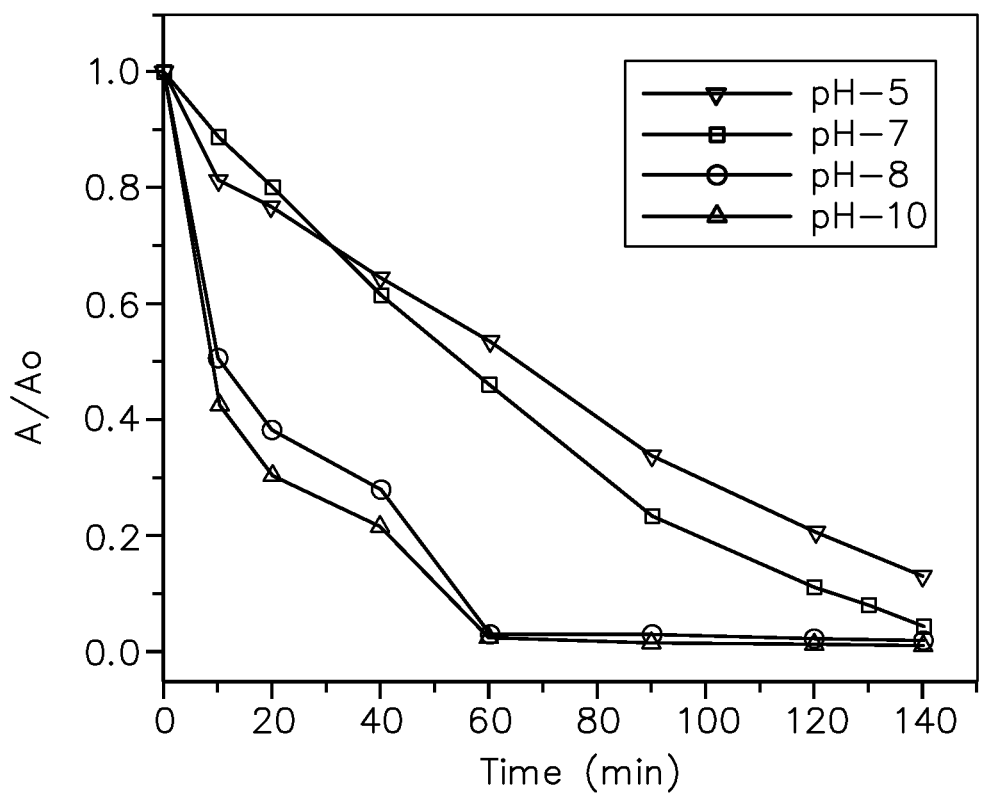
FIG. 7 is a graph of $A/A^0$ vs irradiation time for brilliant cresyl blue at various pH in the presence of Fe doped ZnO nano-particle.

FIG. 7 shows the change in absorbance as a function of irradiation time for the brilliant cresyl blue in the presence of Fe doped ZnO nano-particle photocatalyst. Irradiation of an aqueous solution of brilliant cresyl blue in the presence of Fe doped ZnO nano-particle photocatalyst lead to decrease in absorption intensity.

Reaction kinetics for brilliant cresyl blue, indigo carmine and gentian violet at pH 10 in the presence of Fe doped ZnO nano-particle photocatalyst was performed to further characterize the catalyst. In order to realize the degradation behaviors we studied the degradation pattern of brilliant cresyl blue at different pH (pH 5-10) by Langmuir-Hinshelwood (L-H) model. Langmuir-Hinshelwood (L-H) model well defines the relationship among the rate of degradation and the initial concentration of brilliant cresyl blue at different pH in photo-catalytic reaction. The rate of photo-degradation was calculated by using Eq. (1):

$$r = -dC/dt = K_r KC = K_{app} C \quad \text{(Eq. 1)}$$

Where r is the degradation rate of brilliant cresyl blue at pH 5, 7, 8, and 10, $K_r$ is the reaction rate constant, K is the equilibrium constant, C is the reactant concentration. When C is very small, then $K_C$ is negligible; so that Eq. (1) became first order kinetic. Setting Eq. (1) under initial conditions of photo-catalytic procedure, ($t=0$, $C=C_0$), it became Eq. (2).

$$r = \ln C/C_0 = kt \quad \text{(Eq. 2)}$$

Half-life, $t_{1/2}$ (in min) is $$t_{1/2} = 0.693/k \quad \text{(Eq. 3)}$$

Figure 8:
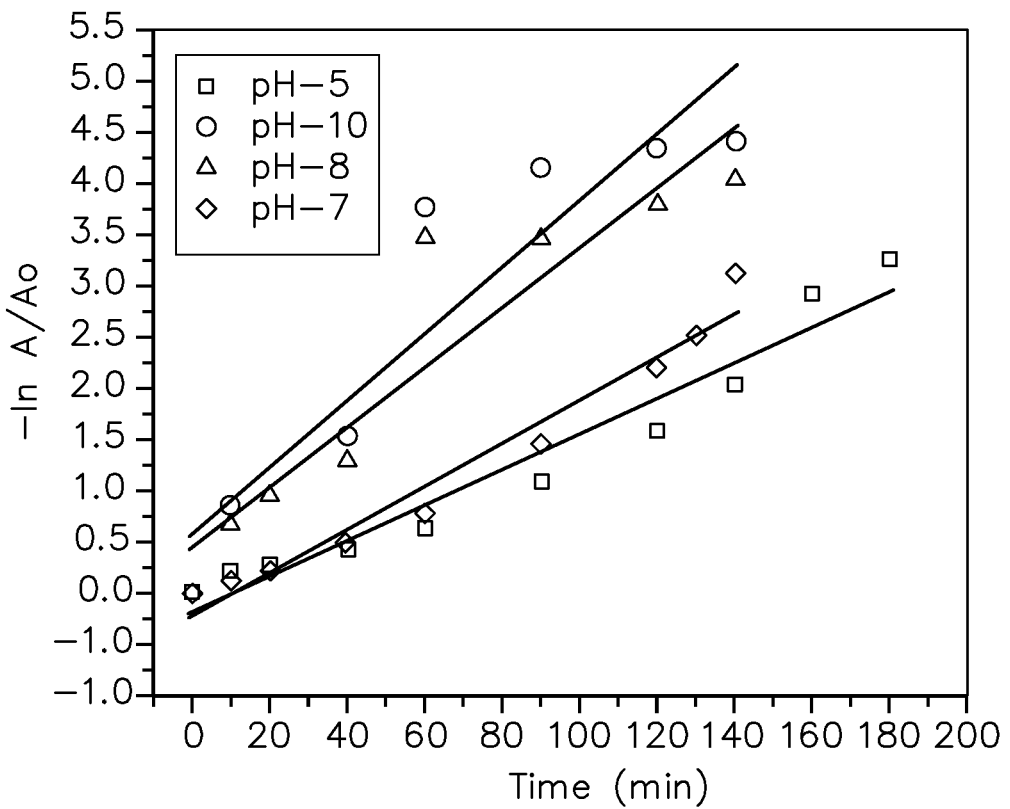
FIG. 8 is a graph representing Pseudo-first order kinetics for brilliant cresyl blue at various pH in the presence of Fe doped ZnO nano-particle photocatalyst.

FIG. 8 shows that the degradation of brilliant cresyl blue at various pH followed first-order kinetics (plots of $\ln(C/C_0)$ vs time showed linear relationship). First-order rate constants, evaluated from the slopes of the $\ln(C/C_0)$ vs. time plots and the half-life of the degraded organic compounds can then be easily calculated by Eq. (3) [Mohapatra and Parida (2011)]. The rate constant for Fe doped ZnO nano-particle photocatalyst at pH 5, 7, 8, and 10 were found to be 0.017 $\text{min}^{-1}$ ($t_{1/2}=40.8$ min), 0.021 $\text{min}^{-1}$ ($t_{1/2}=33.0$ min), 0.029 $\text{min}^{-1}$ ($t_{1/2}=23.9$ min) and 0.032 $\text{min}^{-1}$ ($t_{1/2}=21.7$ min), respectively. Thus the kinetic study revealed that Fe doped ZnO nano-particle photocatalyst is a proficient photo-catalyst for degradation of organic pollutants.

The effect of varying the pH on photo-catalytic activity of Fe doped ZnO nano-particle photocatalyst was done and is shown in FIG. 8. Brilliant cresyl blue exhibited same trend of degradation at all pH but Fe doped ZnO nano-particle photocatalyst shows different activity in the presence of brilliant cresyl blue at different pH under same condition as shown in FIG. 8. Fe doped ZnO nano-particle photocatalyst exhibited high activity at pH 10 as compared to pH 5-8. Thus at high pH, the participation of $OH^-$ might be suggested to be responsible for the higher photo-catalytic activity of the catalyst. The results eludes to the conclusion that as prepared Fe doped ZnO nano-particle photocatalyst synthesized by very simple synthesis procedure shows considerable solar photo-catalytic activity. So it can be a beneficial solar photo-catalyst for organic pollutants.

Figure 9:
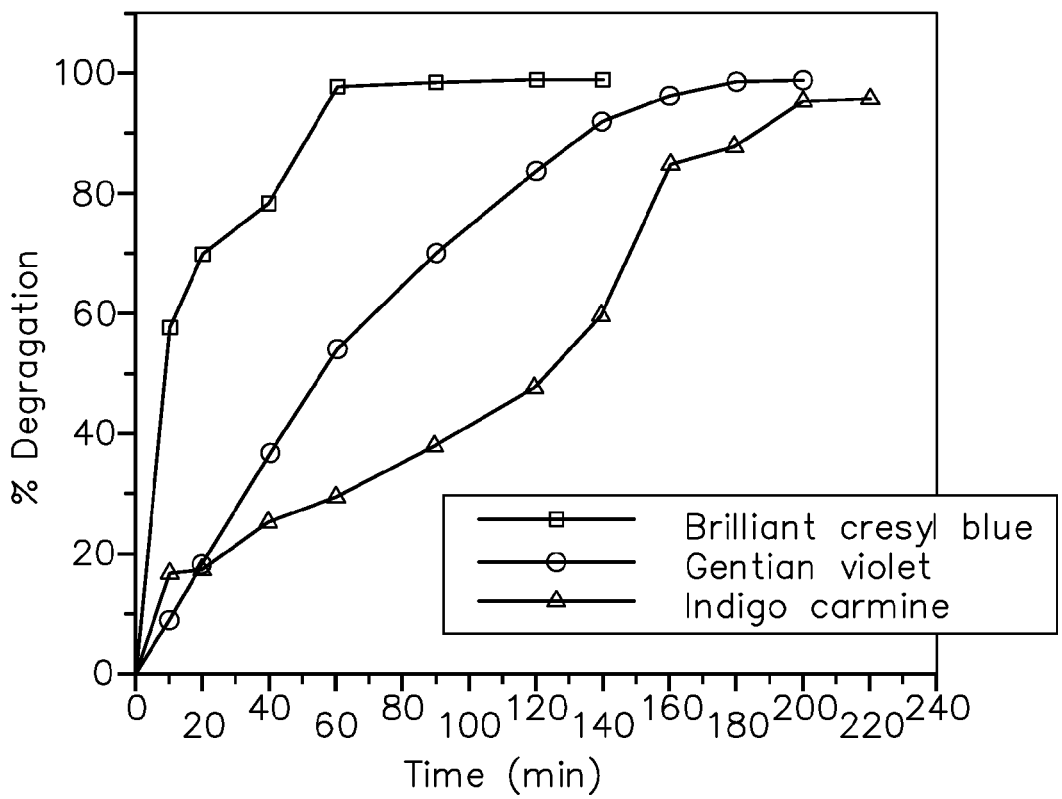
FIG. 9 is a comparison of % degradation for brilliant cresyl blue, indigo carmine and gentian violet at pH 10 in the presence of Fe doped ZnO nano-particle photocatalyst.

Comparison of percentage degradation for brilliant cresyl blue, indigo carmine and gentian violet at pH 10 in the presence of Fe doped ZnO nano-particle photocatalyst. The percent degradation graph of indicates that BCB degrades more rapidly in short response time as compared to indigo carmine and gentian violet at pH 10 in the presence of Fe doped ZnO nano-particle photocatalyst as shown in FIG. 9.

Figure 10:
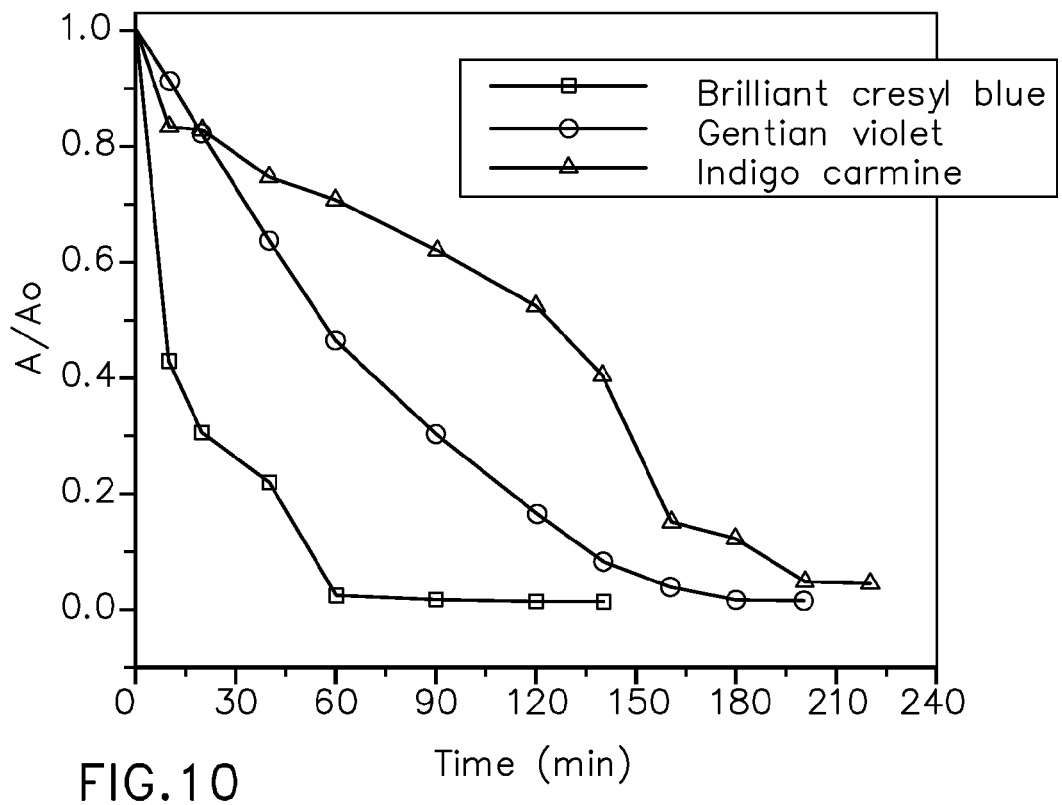
FIG. 10 is a comparison of $A/A^0$ for brilliant cresyl blue, indigo carmine and gentian violet at pH 10 in the presence of Fe doped ZnO nano-particle photocatalyst.

Comparison of $A/A^0$ for brilliant cresyl blue, indigo carmine and gentian violet at pH 10 in the presence of Fe doped ZnO nano-particle photocatalyst is shown in FIG. 10. FIG. 10 clearly indicated that all dyes follow the same pattern of degradation at pH 10 in the presence of nano-particles.

Figure 11:
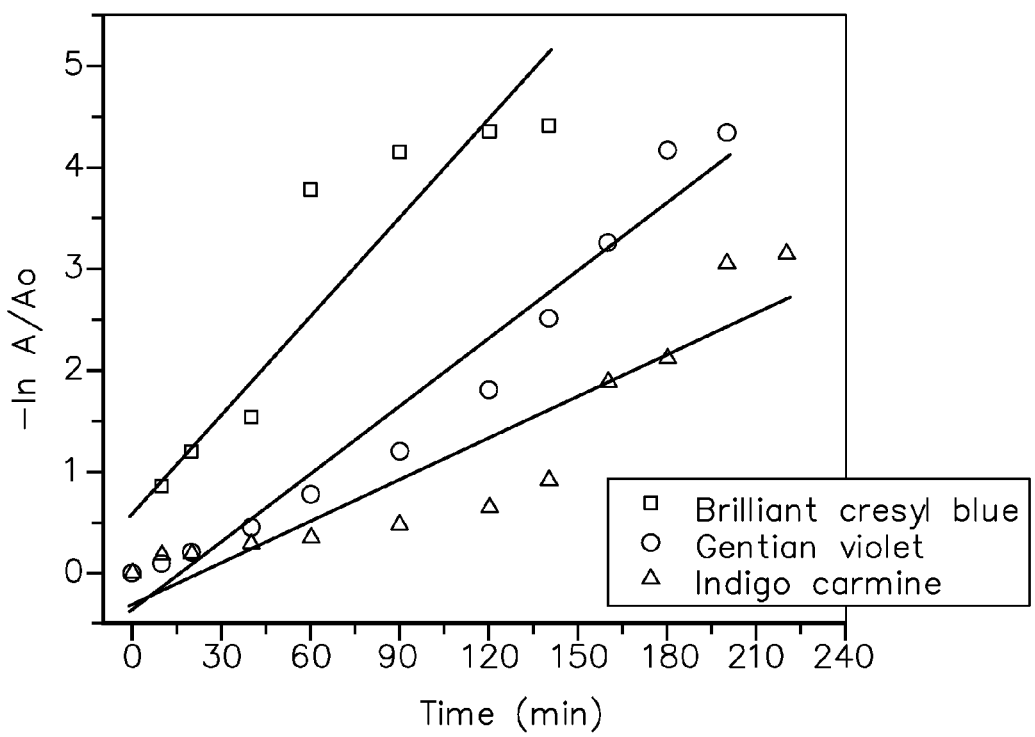
FIG. 11 is a representation of Pseudo-first order kinetics for brilliant cresyl blue, indigo carmine and gentian violet at pH 10 in the presence of Fe doped ZnO nano-particle photocatalyst.

Reaction kinetics for brilliant cresyl blue, indigo carmine and gentian violet at pH 10 in the presence of Fe doped ZnO nano-particle photocatalyst. Using Langmuir-Hinshelwood (L-H) model, we calculated the rate constant for brilliant cresyl blue, indigo carmine and gentian violet in the presence of Fe doped ZnO nano-particle photocatalyst which were found to be 0.032 $min^{-1}$ ($t_{1/2}$=21.2 min), 0.022 $min^{-1}$ ($t_{1/2}$=31.5 min) and 0.014 $min^{-1}$($t_{1/2}$=49.5 min). Thus the kinetic study revealed that Fe doped ZnO nano-particle photocatalyst is better photocatalyst for BCB as compared to indigo carmine and gentian violet as shown in FIG. 11.

INDUSTRIAL APPLICABILITY

This photo-catalyst can simply degrade the organic pollutants in the presence of sun light. It is cheap, easy to handle, simple to grow and more effective photocatalyst.

In addition, the specification and drawings are to be regarded in an illustrative rather than as in a restrictive sense.

What is claimed is:

1. A method of using a photocatalyst, comprising:
adjusting a pH of a toxic organic material comprising of one or more dyes in aqueous solution; adding the photocatalyst for a specific time and a specific concentration, wherein the catalyst is Fe doped ZnO nano-particle photocatalyst; stirring the mixture of the photocatalyst and the toxic organic material; and irradiating the mixed solution to a solar light for a specific time to degrade a specific percentage of the toxic organic material, wherein the specific time is between 60 minutes to 150 minutes.

2. The method of using the photocatalyst as in claim 1, wherein the toxic organic material is at least one of brilliant cresyl blue, indigo carmine and gentian violet.

3. The photocatalyst of claim 2, wherein the specific photocatalyst Fe doped ZnO nano-particle photocatalyst has a specific size.

4. The photocatalyst of claim 3, wherein the specific size is 100 nm.

5. The method of using the photocatalyst as in claim 2, wherein the toxic organic material is brilliant cresyl blue.

6. The method of using the photocatalyst as in claim 1, wherein the pH is between 5-10 pH.

7. The method of using the photocatalyst as in claim 6, wherein the pH is 10.

8. The method of using the photocatalyst as in claim 1, wherein the solar light absorption region is between 480 to 800 nm wavelength.

9. The method of using the photocatalyst as in claim 1, wherein the specific percentage is between 86-98.8%.

10. The method of using the photocatalyst as in claim 9, wherein the solar light absorbs in a wavelength range of 480-800 nm.

11. The method of using the photocatalyst as in claim 9, wherein the percentage of degradation is 98.8%.

12. The method of using the photocatalyst as in claim 1, wherein the specific light is solar light, the specific toxic organic material is brilliant cresyl blue and the specific pH is 10.

* * * * *